May 8, 1951  G. B. R. FEILDEN  2,551,660
LUBRICANT SYSTEM FOR GAS TURBINE AERO ENGINES
Filed Nov. 2, 1945  4 Sheets-Sheet 1
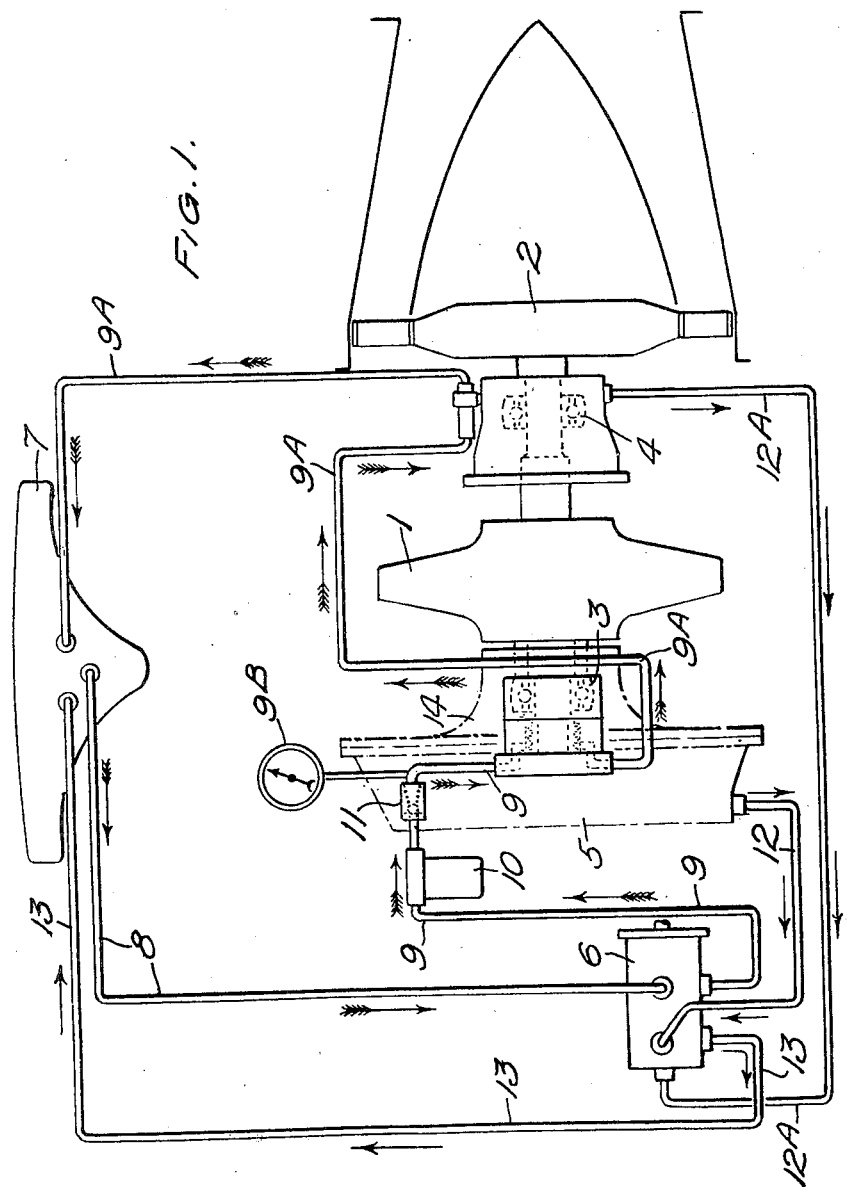
Inventor
Geoffrey Bertram Robert Feilden
by Stevens and Davis
his attys

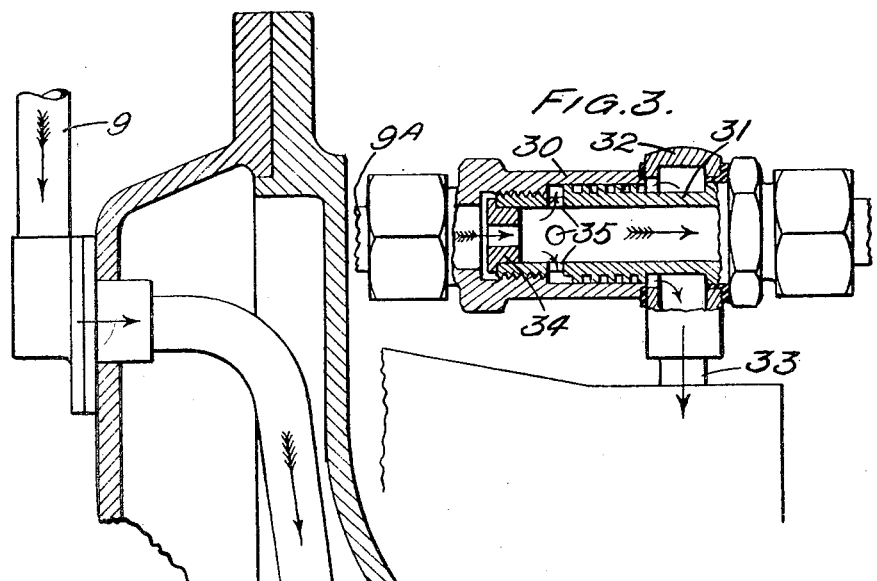
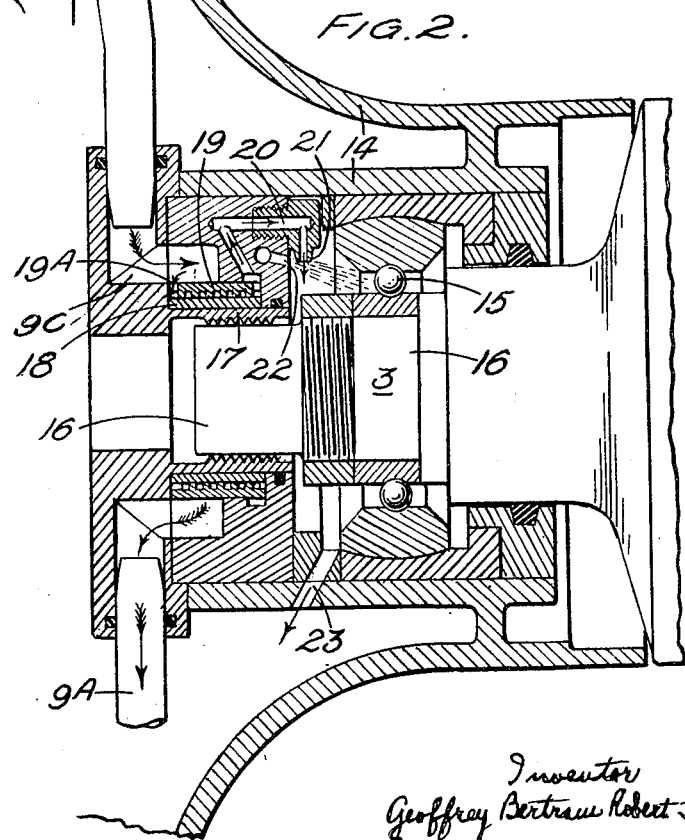

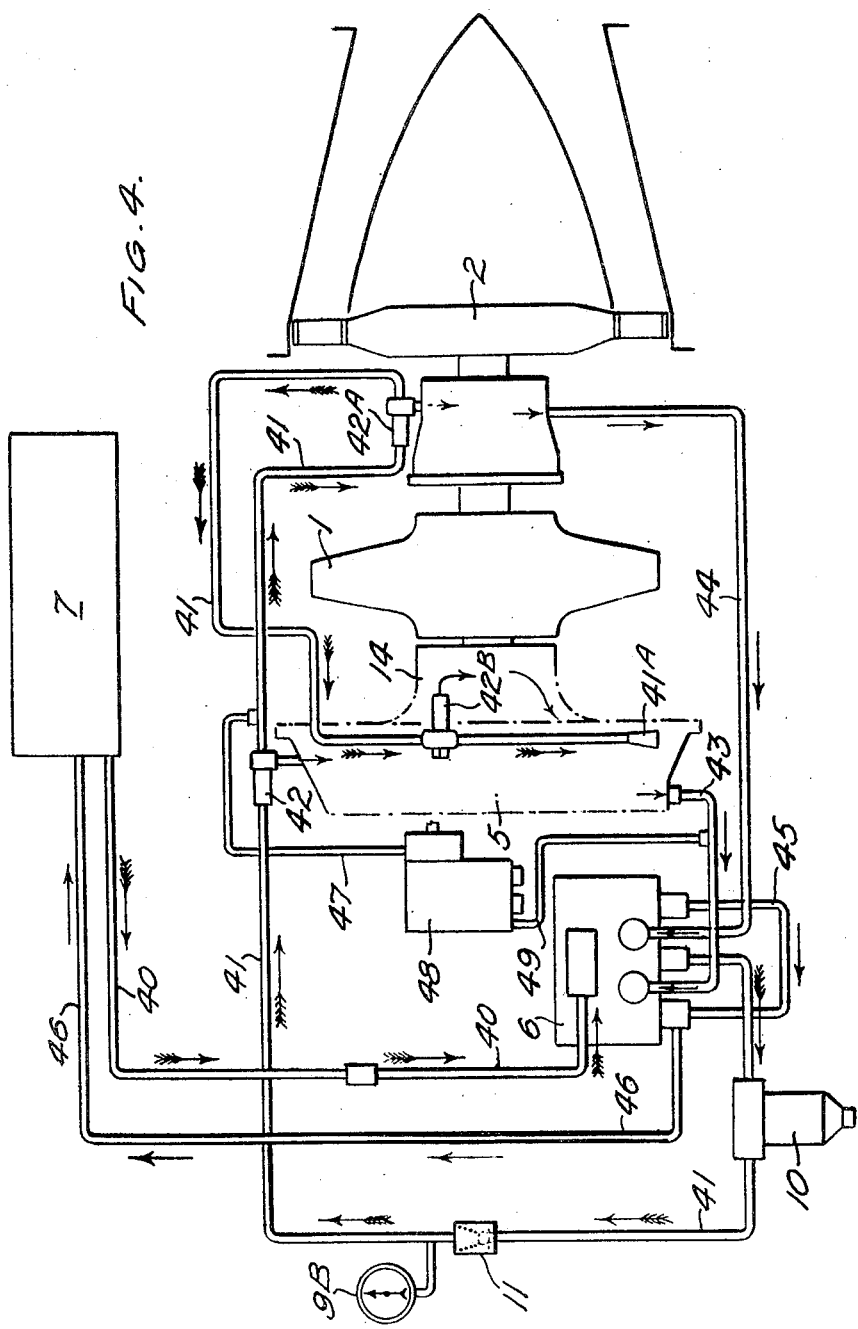

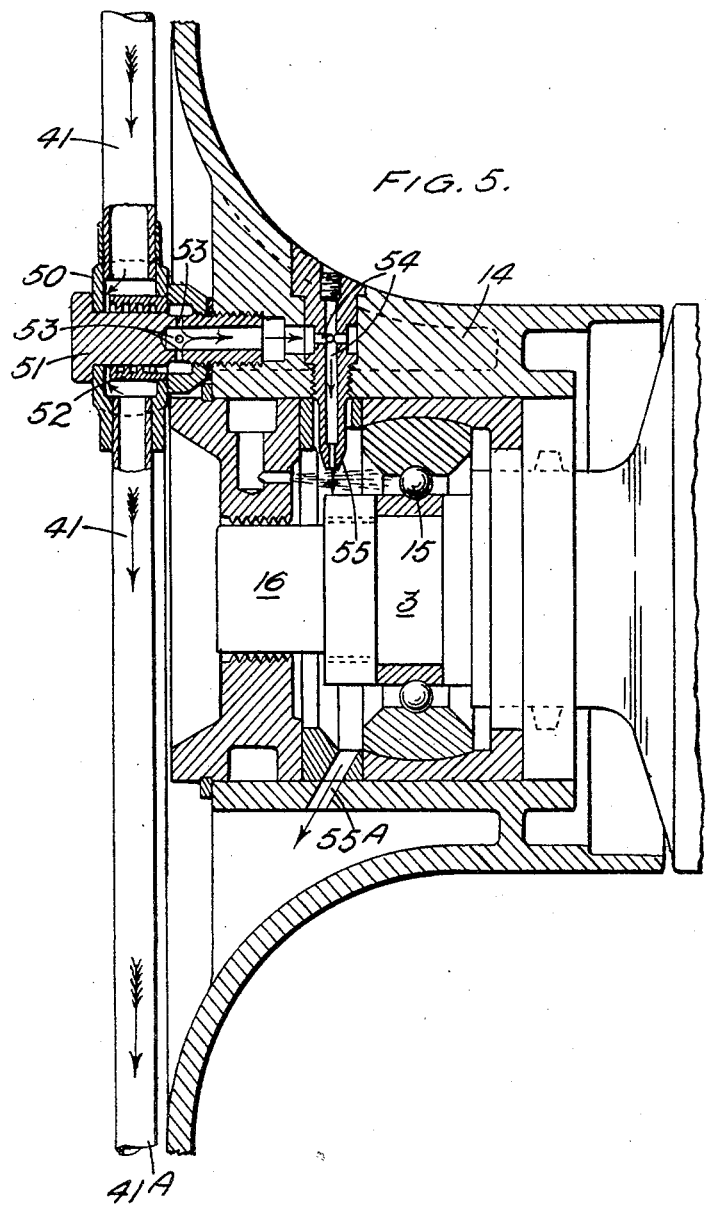

Patented May 8, 1951

2,551,660

UNITED STATES PATENT OFFICE 2,551,660

LUBRICANT SYSTEM FOR GAS TURBINE AERO ENGINES

Geoffrey Bertram Robert Feilden, Lutterworth, near Rugby, England, assignor to Power Jets (Research & Development) Limited, London, England Application November 2, 1945, Serial No. 626,299
In Great Britain April 1, 1943

Section 1, Public Law 690, August 8, 1946
Patent expires April 1, 1963

4 Claims. (Cl. 184—6)

This invention relates to lubrication systems and more especially to such systems in which it is required to meet conditions of widely varying temperature and more especially very cold external conditions such as are met with in aircraft installations.

It is the primary object of the invention to provide a lubrication system for gas turbine aero engines which whilst being simple in construction and arrangement will nevertheless remain effective over the required range of conditions. The invention is deemed to be particularly suitable for application where lubrication oil is required to be delivered to a plurality of bearings or other assemblies the localities of which may be somewhat widely separated, the piping which conveys the oil being somewhat lengthy and probably tortuous, and exposed to the ambient conditions.

According to the invention, a lubrication system comprises means for continuously circulating a flow of lubricant at a comparatively large rate in a main circuit which offers substantial viscous resistance to flow, and tappings from this main circuit to the recipient localities each of which tappings includes adjustable flow restricting means comprising a passage such as to offer viscous resistance so proportioned to that in the circuit downstream of the respective tapping as to pass the lubricant at the required rate of flow when the viscosity of the lubricant in the main and tapped flows are the same. Since the rate of flow in the circuit and through the tapping is controlled by viscosity and by pressure, and the applied pressure can be deemed to be the same both for main and tapped flow, it follows that the viscosity effect will be the same for both (assuming the viscosity to be uniform throughout) so that the rate of flow through a tapping will remain proportional to the rate of the main flow even though the pressure varies—and even when such variation is due in its turn to viscosity variation due to temperature. The proportionality imposed by a restriction in a tapping is therefore, in effect, independent of the viscosity of the oil. If the circulation be by a virtually positive-displacement pump as is preferred, the rate of main flow is determined by pump speed only, and therefore the rate of flow through a tapping is likewise determined by pump speed. The restriction device can therefore for practical purpose be regarded as a metering device, in the conditions of proposed use.

Means are also taken to ensure that the viscosities of lubricant in the main circuit and in the tapping remain the same or nearly the same, by minimising the exposure of the tappings to any temperature except that of the main flow, or of parts likely to be in the same order of temperature as the main flow.

The restriction means used for a tapping preferably take the form of a passage of great length as compared with its cross sectional area, such as the helix formed by a thread; this enables very small orifices or passages with the chance of their blockage, to be avoided. Moreover, a helical passage lends itself to constructions (three of which will be described in greater detail hereinafter) in which considerable passage length is afforded without loss of compactness, and in which the whole restrictor element can be readily thermally controlled. The invention also includes the provision in or in conjunction with systems having the aforementioned features, of further features including scavenging arrangements, unrestricted tappings for different requirements (such as servo-mechanism requiring a pressure fluid for operation), check valve means to prevent gravitational flow of oil when no flow is required, and air-oil spray means for distributing the oil at recipient localities.

The invention will now be described in two examples, which though not different fundamentally serve to illustrate its adaptability, and also to show certain variations in detail.

Fig. 1 diagrammatically illustrates a first lubrication system according to the invention.

Fig. 2 is a sectional drawing illustrating the arrangements at one oil-recipient bearing of Fig. 1.

Fig. 3 illustrates in part-section, a second detail of Fig. 1.

Fig. 4 illustrates, in the same manner as Fig. 1, a second system according to the invention.

Fig. 5 is a view similar to Fig. 2, of a bearing in Fig. 4.

In Fig. 1 (as also in Fig. 4) the lubrication system is shown as applied to a gas-turbine aircraft engine the relevant main parts of which are shown as a centrifugal air impeller 1, rotating with a turbine 2, the common shafting of this rotor assembly being supported by a front bearing at 3 and a rear bearing at 4, shown housed in stationary engine structure. Forward of the bearing at 3 is a wheelcase or gearbox 5 within which is deemed to be the appropriate gearing etc. for affording auxiliary drives one of which operates an oil pump unit 6 from the rotor shafting.

In such an engine it is required to supply oil to the bearings at 3 and 4 at comparatively low rates—say in the order of .5 to 1 pint per hour. The oil system is as follows.

An oil tank 7 is provided, preferably arranged in relation to the engine so that it receives heat therefrom. From the tank 7 a supply pipe 8 runs to the intake side of a pressure pump, for example a gear pump, embodied in the unit 6. The oil delivered under pressure by this pump flows by a main pipe 9, through a filter 10, and through a lightly loaded check valve 11, to the vicinity of the front bearing 3 where the pipe leads into ducting formed in the bearing supporting structure (see Fig. 2) whence a continuation of the piping (9A) is led to the vicinity of the rear bearing at 4, through the detail shown in Fig. 4, and so back into the tank 7. To the pipe 9 is connected a pressure gauge or indicator 9B.

The front bearing is drained into the bottom of the gearbox 5 (as will be described with reference to Fig. 2) and this oil serves to lubricate the working parts therein. (If necessary, a tapping off the pipe 9 may be provided to supply further oil directly into the gearbox through a restrictor such for example as that shown in Fig. 3.) The sump of the gearbox is scavenged by a pipe 12 running into a scavenge pump embodied in the unit 6. The rear bearing at 4 is scavenged by a second scavenge pipe, 12A, running into the same or a second scavenge pump and the delivery from the scavenge pump or pumps, flows back to the tank 7 by the pipe 13. The direction of supply oil is indicated by feathered arrows, and of scavenge oil by plain arrows. The pump unit 6 may be two or three gear pumps arranged with their corresponding wheels on common spindles, the capacity of the scavenge pumps preferably substantially exceeding that of the pressure pump: or the unit may consist of vane pumps or other suitable type, though it is clearly preferable for convenience, that the gang of pumps comprised in the unit should be driven as one.

Turning to Fig. 2, the arrangement of the bearing at 3 can be seen. Stationary engine structure 14 supports and houses a ball bearing 15 for the rotor shafting 16. The bearing follows known practice in having a spherically formed outer race to allow for slight misalignments. The pipe 9 runs into an annular or partly annular duct 9C, from which runs the pipe 9A. The duct 9C is therefore virtually part of the main oil pipe and contains oil under pressure. Part of the stationary structure consists of a cylindrical oil-seal labyrinth sleeve 17, surrounding the shafting 16. Outside this sleeve is a plain cylindrical element 18 and fitting on the outside of this part 18 is a further cylindrical part 19, which has formed within it a square thread, which is a reasonably close fit on the part 18. The thread forms in effect a long and restrictive conduit, though its actual dimensions are such that the cross-sectional area of the oil path is ample from the point of view of potential blockage by foreign matter. The oil enters the thread through a slot 19A (from the duct 9C) and, passing along the thread, emerges at the other end of the part 19 into an annular duct and thence by a duct formed by drilled bores 20 to a spout or nozzle at 21. Air under pressure (preferably tapped from the blower of the engine) issues from a spraying nozzle 22 directed transversely to the general direction of the oil flowing or dropping from 21 and carries oil particles on to the parts of the bearing 15. This air-oil spraying device is found to be desirable in conjunction with high speed bearings of the kind used in these engines. Oil from the bearing, collecting at the bottom, escapes via the duct 23 into space inside the structure, and the structure is so arranged that it flows into the sump of the gearbox 5 whence it is scavenged as above described. It is to be observed that wherever there is a restricted flow of oil, the location and arrangement is such that such oil is kept warm; also that although viscous restriction can be afforded up to any reasonable requirement, none of the oil passages has to be dimensionally so small as to be likely to suffer obstruction. The effective length or flow resistance of the thread passage can be adjusted in practice by cutting away some of the thread, or by varying its fit on the part 18 so as to allow more or less "short circuiting" between one turn of thread and its neighbours. In general however, this is not found to be a highly critical matter since with such comparatively small rates of flow to the bearing as are contemplated, fairly wide percentage variations do not matter: thus, it may be quite unimportant whether the rate is .5 pint or 1 pint per hour.

Turning now to Fig. 3, the detail shown is the restrictor used for feeding the rear bearing at 4, which can be assumed to have an air-oil spray device associated with it in somewhat similar manner to that of Fig. 2. This type of restrictor may be used for any other tappings to oil-recipient parts, as may be convenient.

The pipe 9A runs into a body 30 of hollow cylindrical form, into the bore of which fits an externally square-threaded hollow plug 31, from which pipe 9A resumes its run. A "banjo" union fitting 32 surrounds part of the plug 31 and leads tapped oil away to the bearing by pipe 33. In the upstream end of the plug 31 is an annular baffle 34 which whilst affording some restriction has for its main object the creation of turbulence in the oil to avoid stratification of cold and hot oil and to effect mixing of these. Most of the oil passing through the baffle 34, flows straight through the assembly back to the tank 7, but the required proportion of it escapes by the radial ports 35 in the plug 31 to pass along the thread and thus out through the hollow interior of the banjo 32. It will be obvious from the drawing how this assembly is put together and rendered oil tight. In this case the relatively small flow of oil which is tapped off is kept warm by virtue of the main bulk of the oil passing through the plug 31, the length of the pipe 33 and its exposure to cold air being minimized as far as possible.

In Fig. 4, whilst many of the elements are the same, those which materially differ from the foregoing bear new reference numerals. It is to be assumed that the rotor comprising the impeller 1 and turbine 2 and its shafting have bearings which are similar and similarly disposed to those of Fig. 1, and here again reappears gearbox 5 and a pump unit 6 which in this case comprises three separated but ganged gear pumps commonly driven. An oil tank 7 is again provided and this supplies through a pipe 40 to the pressure pump which delivers through the main oil pipe 41 with filter, check valve and pressure gauge as before. In pipe 41 is a first restrictor element 42 through which oil is tapped for flow through the gearbox 5, a second restrictor 42A supplying the rear bearing, and a third restrictor 42B supplying the front bearing. Scavenge oil from the gearbox 5 and the front bearing are collected by scavenge pipe 43 and returned to one of the two scavenge pumps in the unit 6, whilst the oil from the rear bearing is scavenged by the pipe 44 leading to the second scavenge pump and the two scavenge pumps (the outlets of which are connected by pipe 45) return the scavenge oil to the tank by the pipe 46. Off the pipe 41 there is an unrestricted branch 47 leading to a piece of mechanism 48 from which there is a return pipe 49 joining the scavenge pipe 43. This arrangement is intended to demonstrate how any piece of mechanism, represented by 48, may be supplied with oil under substantially the full oil pressure, by the same system. The pipe 41 in this case is seen to terminate at 41A where it enters the bottom part of the gearbox 5. The end of the pipe where it enters the gearbox is provided with a suitable restriction to maintain the desired pressure in the pipe 41 and this restriction may again be in the general form employing a thread or of other nature such, for example, as a spring-loaded relief valve. From this in turn can be seen that the whole of the oil supplied by the pressure pump has to be passed back to the tank 7 by the scavenge pumps, the capacity of which must therefore be made adequate for this purpose. This system can also be seen to differ from that of Fig. 1 in the sense that the main pipe does not form a complete "ring" (i. e. does not circulate oil from the tank back into the tank as a continuous pipe circuit) since at one point, that is in the gearbox 5, the pressure will be atmospheric.

The detail at 42B in Fig. 4 is illustrated in Fig. 5 and consists of a variant of the tapping for the front bearing and the internal arrangement thereof. As in Fig. 2 the bearing itself is shown at 15 in a stationary structure 14 and surrounding shafting 16. The pipe 41 in the vicinity of the bearing is interrupted by an annular hollow fitting 50 through which passes axially a partially hollow bolt 51. Surrounding part of the bolt 51 and fitting thereon is an internally square threaded sleeve 52 in such a way that oil can enter the thread at one end (as indicated by the arrows) and, escaping from the other end of the thread this oil passes within the bolt 51 through radial passages 53 whence it flows into drilled ducts 54 to emerge from the oil jet 55. As it emerges it is sprayed on to the bearing 15 by an air blast as in Fig. 2. The bearing is scavenged by the duct 55A. Here again it will be seen that the restriction device is well protected against cooling by being virtually immersed in the greater bulk of the passing oil whilst the internal ducting such as at 54 is so placed within the mass of surrounding structure and in relation to the shafting and bearing that it is kept sufficiently warm.

The piping where it is exposed to cold air is lagged and it will be observed that it is in the operational nature of the systems comparatively large bore piping and the main pipe in each case is well adapted to pass oil at a comparatively high rate of flow. These factors minimize the dangerous potentialities of oil freezing or coagulation due to cold and even if a stratum of oil against the wall of the piping gets sufficiently cool to congeal the large bore which the main piping may have renders such stratification unimportant. In the vicinities of the recipient points not only can the temperature be kept up but it is no problem to local tubulence, as already mentioned, to mix the oil and therefore tend to make its temperature uniform.

I claim:

1. In or for a gas turbine aero engine, a lubrication system for delivering lubricant to a plurality of localities comprising a reservoir for lubricant, a pressure pump supplied from the said reservoir, a main conduit for continuously circulating the main lubricant flow at a comparatively large rate and returning pumped lubricant to said reservoir, and tappings from said conduit to said localities, each tapping comprising a restriction presenting a resistance to flow which bears a predetermined relationship with the resistance to flow in the said conduit downstream of said tapping when the viscosity of the lubricant in the said conduit is the same as that in said tapping, and means to ensure that the temperature of the lubricant in said tapping is substantially equal to the temperature of the lubricant in said conduit, at least one of said tapping restrictions comprising a passage having a length which is large relative to its cross sectional area, said passage being effectively immersed in the main conduit whereby the lubricant in said restriction is thermally responsive to the temperature of the lubricant in said main conduit.

2. A system according to claim 1 wherein at least one of said tapping restrictions comprises a helical passage formed by a thread fitting against a cylindrical surface.

3. A system according to claim 1 wherein at least one of said tapping restrictions comprises a helical passage in the immediate vicinity of and surrounding a rotating member of which a bearing is the corresponding oil-recipient locality whereby the temperature of the lubricant through said tapping is maintained by heat supply associated with the said rotating member.

4. In or for a gas turbine aero engine, a lubrication system for delivering lubricant to a plurality of localities comprising a reservoir for lubricant, a pressure pump supplied from the said reservoir, a main conduit for continuously circulating the main lubricant flow at a comparatively large rate and returning pumped lubricant to said reservoir, and tappings from said conduit to said localities, each tapping comprising a restriction presenting a resistance to flow which bears a predetermined relationship with the resistance to flow in the said conduit downstream of said tapping when the viscosity of the lubricant in the said conduit is the same as the viscosity of the lubricant in said tapping; and means for ensuring that the two said viscosities remain equal, the said means comprising a first tube having one of its walls cylindrical and its other wall formed with a screw thread, and a second tube having at least one of its walls cylindrical and arranged coaxially with respect to said first tube so that the screw thread of said first tube abuts against the cylindrical wall of said second tube to form a helical passage to constitute the tapping restriction, the cylindrical wall of said first tube being washed by the main lubricant flow.

GEOFFREY BERTRAM ROBERT FEILDEN.

REFERENCES CITED

The following references are of record in the file of this patent:

UNITED STATES PATENTS

| Number | Name | Date |
|---|---|---|
| 869,138 | Emmet | Oct. 22, 1907 |
| 1,090,773 | Winton | Mar. 17, 1914 |
| 1,211,406 | Canton | Jan. 9, 1917 |
| 1,329,038 | Curtiss | Jan. 27, 1920 |
| 1,595,432 | Vincent | Aug. 10, 1926 |
| 1,680,936 | Culp | Aug. 14, 1928 |
| 1,732,579 | Gleason | Oct. 22, 1929 |
| 1,911,450 | Kocher | May 30, 1933 |
| 2,334,942 | Malone | Nov. 23, 1943 |

FOREIGN PATENTS

| Number | Country | Date |
|---|---|---|
| 343,552 | Germany | Nov. 3, 1921 |
| 305,204 | Great Britain | July 18, 1929 |
| 336,352 | Great Britain | Oct. 16, 1930 |
| 275,259 | Great Britain | Mar. 8, 1938 |